United States Patent [19]

Kitamura

[11] 4,404,571
[45] Sep. 13, 1983

[54] MULTIBEAM RECORDING APPARATUS

[75] Inventor: Takashi Kitamura, Yokohama, Japan

[73] Assignee: Canon Kabushiki Kaisha, Tokyo, Japan

[21] Appl. No.: 309,058

[22] Filed: Oct. 6, 1981

[30] Foreign Application Priority Data

Oct. 14, 1980 [JP] Japan .............................. 55-143447
Oct. 14, 1980 [JP] Japan .............................. 55-143448

[51] Int. Cl.³ ........................ G01D 9/42; G01D 15/10
[52] U.S. Cl. .................................. 346/108; 346/76 L
[58] Field of Search ............................ 346/108, 76 L

[56] References Cited

U.S. PATENT DOCUMENTS

| | | | |
|---|---|---|---|
| 2,946,643 | 7/1960 | Hutchison et al. | 346/108 X |
| 3,050,731 | 8/1962 | Usdin | 346/108 X |
| 3,474,459 | 10/1969 | Silverman | 346/108 |
| 3,848,087 | 11/1974 | Carrell | 346/108 X |
| 3,999,010 | 12/1976 | Oosaka et al. | 346/76 L X |
| 4,067,021 | 1/1978 | Baylis et al. | 346/76 L |
| 4,253,102 | 2/1981 | Kataoka et al. | 346/108 |
| 4,298,974 | 11/1981 | Tsunoda et al. | 346/76 L X |
| 4,323,906 | 4/1982 | Ohnishi et al. | 346/76 L |

Primary Examiner—Donald A. Griffin
Attorney, Agent, or Firm—Fitzpatrick, Cella, Harper & Scinto

[57] ABSTRACT

A multibeam recording apparatus comprises a scanner for scanning a recording medium with a plural number of beams, a beam detector for producing detection signals in response to the incident of every beam on the detector, a distributor for distributing the detection signals and a controller for controlling the start of recording with the beams individually by means of the distributed detection signals.

18 Claims, 10 Drawing Figures

MULTIBEAM RECORDING APPARATUS

BACKGROUND OF THE INVENTION

1. Field of the Invention

The present invention relates to a beam recording apparatus of the type in which a plural number of beams are modulated by modulation signals and given information is recorded on a recording medium by scanning the recording medium with the modulated beams.

2. Description of the Prior Art

In the conventional beam recording apparatus a simple beam has been used to record information on a recording medium. In order to increase the recording speed of such apparatus, it is required to increase the transfer speed of a beam modulating information signal.

Also, it is required to increase the speed of principal scanning. When a rotary polygonal mirror is used for principal scanning, the rotational speed of the mirror must be increased, sometimes, up to tens of thousands of rpm. Due to structural limitation, such high rotational speed is difficult to attain. For these reasons, it has been practically impossible to provide a high speed recording apparatus using a single beam.

As a solution to the above problem, it has already been proposed to use a plural number of beams. In the known multibeam recording apparatus, a plural number of beams are independently modulated by recording signals and a recording medium is scanned by these modulated beams at the same time.

An important problem involved in the multibeam recording system is the manner of arrangement of the beams relative to the scan direction, which will be described hereinunder with reference to FIGS. 1A and 1B.

FIG. 1A illustrates the case wherein beams B1–B4 are arranged at right angles with the scan direction SL. In this case, the positions irradiated by the beams are all concentric relative to the scan direction. Therefore, all of the beam positions can be detected by detecting only one of the beam positions. Consequently, controls on the plural number of beams including the control of start timing of beam modulation can be carried out without difficulty.

However, this arrangement of beams at right angles with the scan direction SL has a disadvantage that the spacing between picture elements formed on the recording medium is determined directly by the spacing between scanning beams. The beam spacing should be equal to the picture element spacing. As the spacing between scanning beams is limited, the density of picture elements is automatically limited by the limitation imposed on the arrangement of scanning beams. With this arrangement of beams, therefore, it is practically impossible to reproduce a high density image.

FIG. 1B illustrates another case wherein the beams B1–B4 are arranged at an inclination angle of $\theta$ with the straight line L–L' normal to the scan direction SL. With this arrangement, it is made possible to obtain a larger beam spacing Pl than the determined picture element spacing PS. This means that the picture element spacing PS can be selected at will independently of the beam spacing Pl. However, in this case, the beam irradiation positions relative to the scan direction are different from each other and therefore different scanning start positions for different beams must be set.

To this end, it has been proposed to use a beam detector and timers. The beam detector is provided at a position out of the range of the recording medium. Prior to scanning, the first beam is directed to the beam detector to obtain a signal. The signal thus obtained is used as a scanning start signal for the first beam. Scanning start signals for other beams subsequent to the first one are obtained by the timers which respectively are actuated by the scanning start signal for the first beam. This method for generating different scanning start signals is the subject of our prior applications (U.S. patent application Ser. Nos. 184,146 and 164,522 the latter having been abandoned in favor of U.S. Continuation Application Ser. No. 395,183).

Naturally, the accuracy of such scanning start signals depends on the precision of the timers used. There may occur such case where the timers set false scanning start positions the scanning beams. Generally speaking, this method lacks adequate reliability.

Also, if there occurred drop in output or failure of proper output in any one of the plural number of scanning beams, then an error in operation would result. To prevent such trouble, many detectors must be provided to continuously detect the states of the respective beam generators and also detect the states of outputs from the respective beam generators. This makes the structure of the apparatus very complicated.

SUMMARY OF THE INVENTION

Accordingly, it is a general object of the invention to eliminate the above disadvantages of the prior art recording apparatus that use a plural number of beams and to provide an improved multibeam recording apparatus.

It is a more specific object of the invention to provide such multibeam recording apparatus which permit simple and sure detection of the respective position signals of a plural number of beams which are not at right angles with the scan direction.

It is another object of the invention to provide such multibeam recording apparatus which permits control in a simple and reliable manner of the timing of start of mudulation for the scanning beams.

It is a further object of the invention to provide such multibeam recording apparatus in which any state change of the beams such as a drop in beam output can be detected in a simple manner.

Other and further objects, features and advantages of the invention will appear more fully from the following description taken in connection with the accompanying drawings.

DESCRIPTION OF PREFERRED EMBODIMENT

Figure 2:
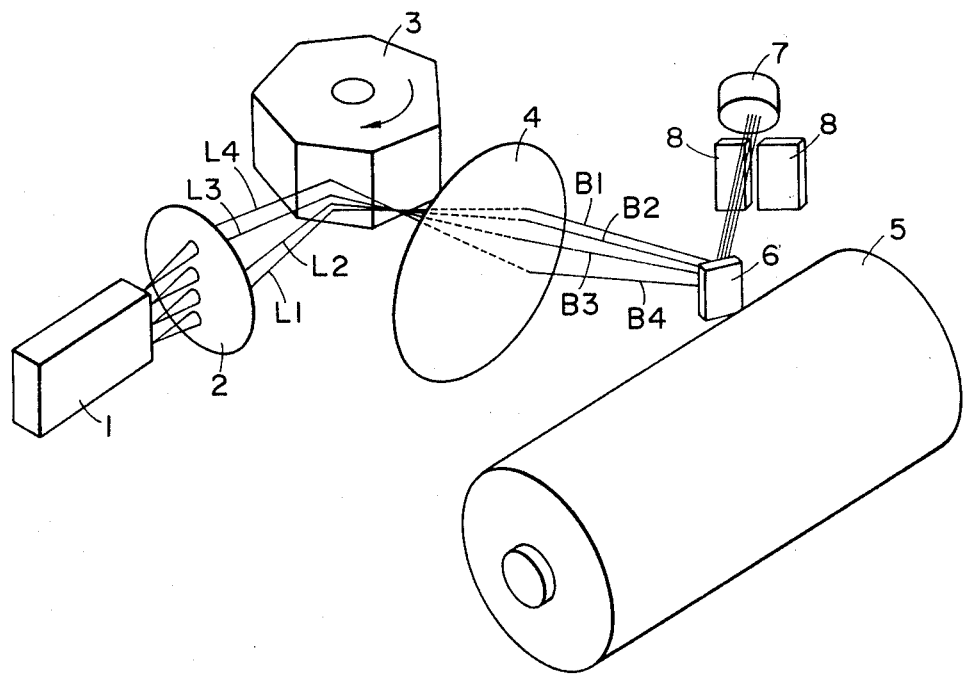
FIG. 2 is a perspective view of a recording apparatus showing an embodiment of the present invention.

Referring to FIG. 2 showing an embodiment of the present invention, the recording apparatus has a light source unit 1 which may be, for example, a laser array comprising a plural number of semiconductor lasers arranged in a row. The diverging light from the light source unit 1 is collimated by a condenser lens 2 to form collimated beams $L_1$, $L_2$, $L_3$ and $L_4$. Designated by 3 is a rotary polygonal mirror for directing the beams $L_1$, $L_2$, $L_3$ and $L_4$ to a photosensitive drum 5 to be scanned by the beams. The scanning beams are focused on the drum 5 through a $F-\theta$ lens 4. At the fore end of the scan line there is provided a reflecting mirror 6 for leading the scanning beams to a detector 7.

Figure 3:
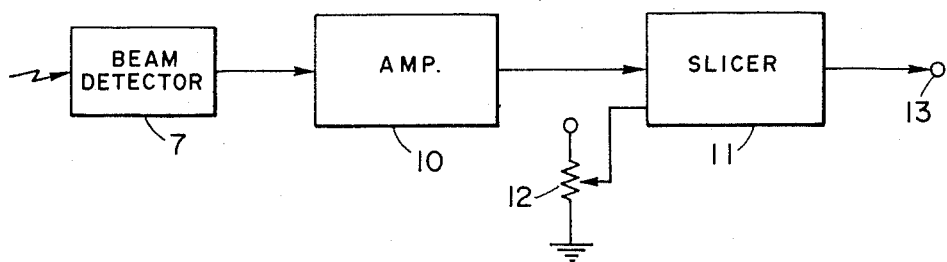
FIG. 3 is a block diagram of the beam detector circuit.

To accurately detect the position of every scanning beam, a light screen plate 8 is provided in front of the detector 7. The screen plate 8 has a slot through which the beams are allowed to fall on the detector 7. Except for the slot portion, the screen plate 8 cuts off the beams running toward the detector. Therefore, when any scanning beam runs across the slot provided in the screen plate 8, the beam detector 7 is suddenly irradiated by the beam and produces an electric output corresponding to the irradiation by the beam. As shown in FIG. 3, the output from the beam detector 7 is amplified by an amplifier 10 and then sliced by a slicer 11. The level at which the output is sliced is determined by a potentiometer 12. The slicer 11 puts out the sliced output through its terminal 13.

Figure 4:
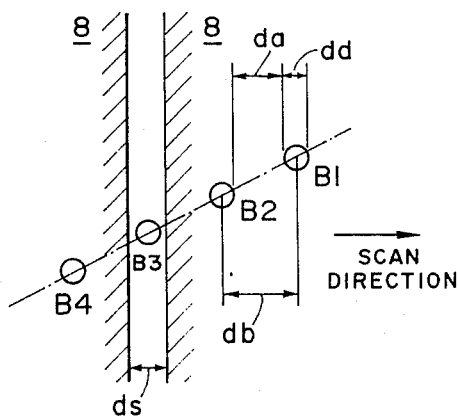
FIG. 4 shows the positional relation between beams and a screen plate.

FIG. 4 illustrates the positional relation between the beam and the screen plate 8. The width of the slot provided in the screen plate 8 is denoted by ds and the spacing between beams in the scan direction by da. The slot width ds must be smaller than the beam spacing da. Let $d_d$ denote the beam diameter measured in the scan direction and $d_b$ the center distance between two neighbouring beams measured in the scan direction. Then, the beam spacing da is represented by: $da = d_b - d_d$.

ds<da is the requirement for separating one beam from the next beam. The screen plate 8 should have also a sufficiently large effective area to block out all of the beams as measured in the direction normal to the scan direction. This is the requirement to make only one beam incident on the beam detector 7 through the slot. As the detector 7 has an opening large enough to receive all of the beams, it is absolutely necessary to select only one of the beams every time by the screen plate. Otherwise, two or more beams will enter the detector 7 at the same time and the detector will integrate all the incident beams into one output. In such a case, it becomes impossible to judge from the output signal of detector 7 which beam of the plural beams the output should be attributed to.

Figure 5:
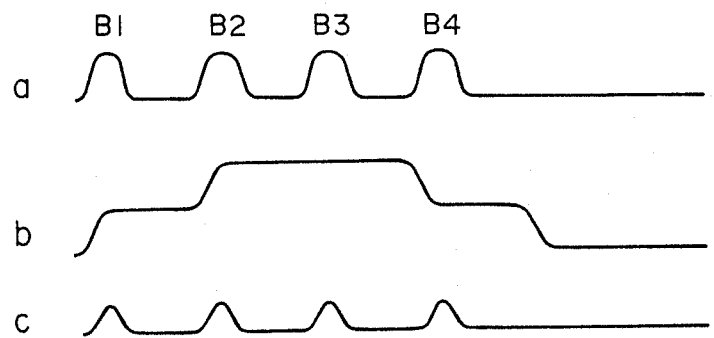
FIG. 5 shows the output signals from the beam detector.

FIG. 5 illustrates the relation between the slot width ds and the output of the detector 7. FIG. 5a shows the waveform of the output signal from the detector 7 obtained when the slot width ds is nearly equal to or a little larger than the beam diameter $d_d$ and smaller than the beam spacing da. In this case, detection of each beam is completely separated from that of the others. FIG. 5b shows the waveform of the output signal obtained when the slot width ds in the screen plate is larger than the center distance $d_b$ between beams. FIG. 5c shows the waveform of the output signal obtained when the slot width ds is smaller than the beam diameter $d_d$. In this case, the quantity of beam incident on the detector 7 is decreased although detection of each beam is completely separated from that of the others. Since the effect of area integration by the detector can not been fully used in the case of c, the output from the detector decreases, which may produce a detection error.

Figure 6:
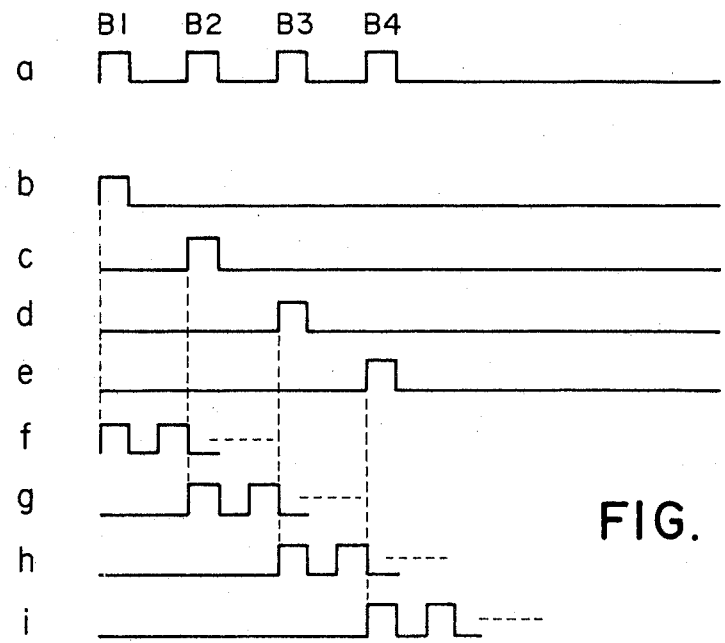
FIG. 6 shows the sliced waveform and the timing signals in the apparatus.

After slicing the waveform shown in FIG. 5a by the slicer 11 there is obtained a waveform as shown in FIG. 6a. This sliced waveform is distributed by a distributor. Then, there are obtained waveforms as shown in FIGS. 6b-6e.

Figure 7:
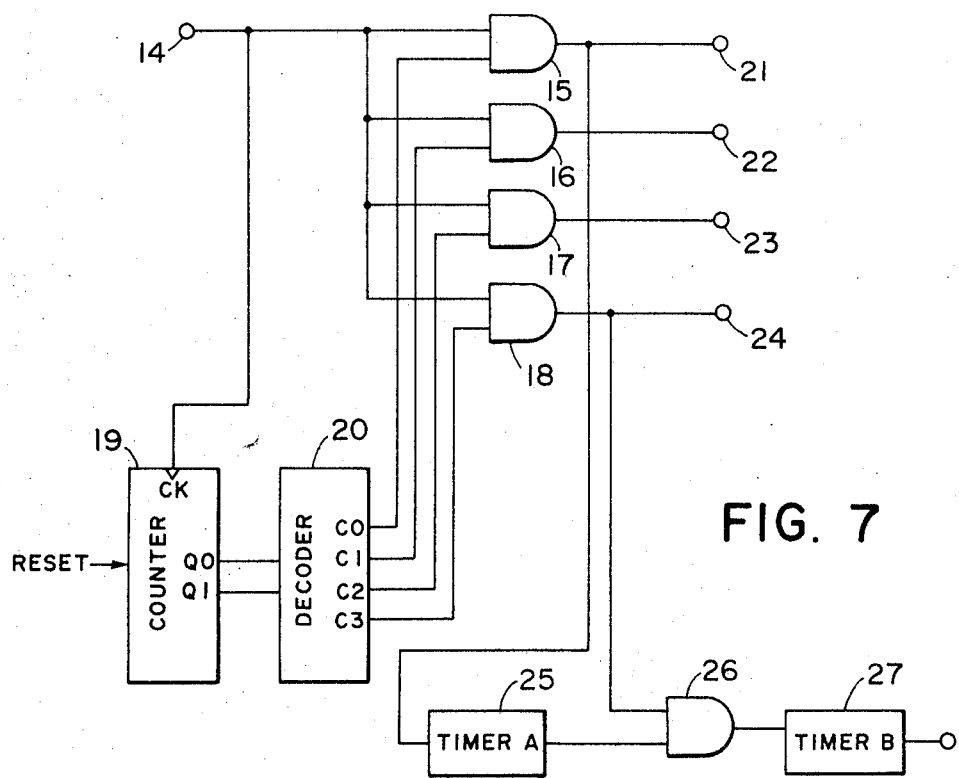
FIG. 7 is a block diagram of the distributor circuit.

FIG. 7 shows the structure of the distributor.

The sliced output (its waveform is shown in FIG. 6a) from the terminal 13 shown in FIG. 3 is applied to a terminal 14. The applied output is introduced into AND gates 15-18 and also into the clock CK of a counter 19 for counting the beam number. The counter 19 is reset by a reset signal to the position of zero output. The reset signal may be a signal indicating of the completion of one beam scanning, a signal indicating the throw-in of the power source in the apparatus or the like. The counter 19 performs the operation of counting by detecting the trailing edge of the sliced signal applied thereto.

The counter output corresponding to the content of the counter 19 is decoded by a decoder 20. The decoder has four output terminals C0 to C3 any one of which is brought into a High state in accordance with the input to the decoder. At the first output of a signal from the slicer, only the output at the terminal C0 becomes High and AND gate 15 issues a pulse. Thereby, a modulation start signal for the first beam is put out from its output terminal 21. After the first modulation start signal, the counter 19 counts up one by one every time a pulse is delivered through the terminal 14. The output of the decoder 20 changes from $C_1$ to $C_2$ and then to $C_3$ accordingly. Therefore, the output terminal from which the pulse is put out, changes from terminal 22 to 23 and then to 24 sequentially. In this manner, a series of pulses are sequentially distributed to the output terminals 21, 22, 23 and 24 in this order.

In FIG. 7, reference numerals 25 and 27 designate timers A and B. 26 is an AND circuit. The function of the timer A 25 and AND circuit 26 is to detect trouble in the light source unit. When any trouble such as drop of light output or wrong operation occurs in any one or more of the plural number of lasers, it is detected by timer A and AND circuit 26. To this end, timer A is preset to put out a High signal beginning with receipt of the first beam pulse from AND gate 15 and to stop putting out a High signal after receipt of the fourth beam pulse from AND gate 18. The output of timer A is conducted to AND gate 26. During the operation of the timer A, the output of AND gate 18 is applied to AND circuit 26 only when the fourth beam enters the detector. By this output from AND gate 18 and the above output from timer A, the AND circuit 26 is actuated to start timer B. A time chart of these outputs is shown in FIG. 8.

Figure 8:
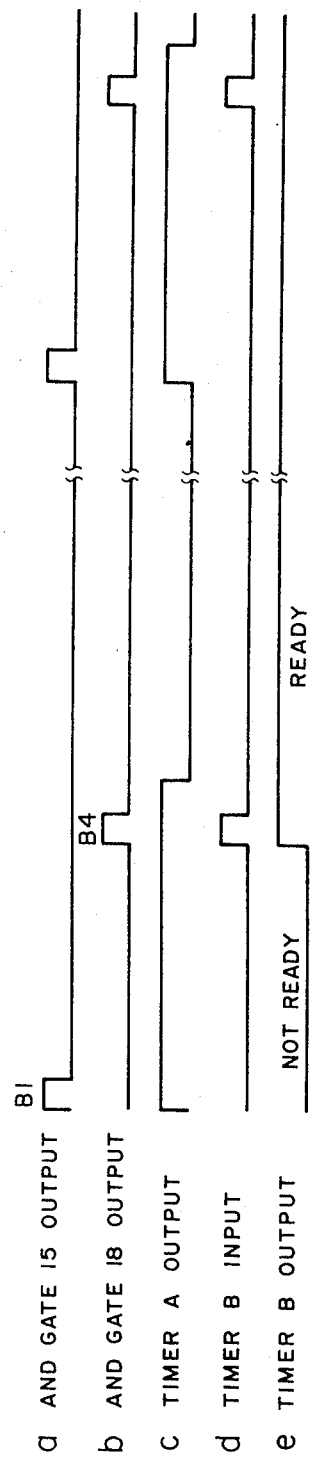
FIG. 8 shows the timer outputs.

In FIG. 8, the waveform a is the detection signal of beam B1 and b is the detection signal of beam B4. c is the output of timer A started by the incidence of beam B1. When the detector 7 receives the beam B4 during the operation of timer A, a waveform d is produced from AND circuit 26. This output d triggers timer B to bring it into operation. The timer B is a timer whose time constant is a little longer than one scanning period. The timer B holds the output of the pulse signal from AND circuit 26 during one scanning period. As the output pulse signal held by timer B is the signal indicating that the last beam has been detected within a regular time period, it is transmitted to the apparatus as READY signal for indicating that the beams are all in normal operation. In response to this READY signal, the apparatus continues to operate normally.

In this manner, the counter 19 is advanced step by step at every detection of a beam by the detector 7. Consequently, with sequential incidences of beams, the output from the decoder 20 moves from C0 to C3. If even one of the lasers is out of order or is reduced in light output, then the number of beams detected by the detector 7 becomes less than the given number of beams (in the illustrated embodiment, the given number of beams is four) or the number of input pulses to the input terminal 14 of the distributor becomes less than the given number of beams because of the drop of light output below the slice level. Therefore, AND gate 18 connected to the C3 output of the decoder can not operate even after all of the beams have passed over the detector 7. Consequently, during the operation of timer A 25, AND circuit 26 receives no signal from AND gate 18 and timer B does not produce a high signal. Since the timer B is not started, no READY signal is produced. Thus, the occurrence of trouble in any beam can be detected by the absence of READY signal. The timer B is started only when all of the given number of beams have correctly entered the beam detector 7 sequentially starting from the first beam and the decoder output has correctly been moved from C0 to C3 sequentially.

Figure 9:
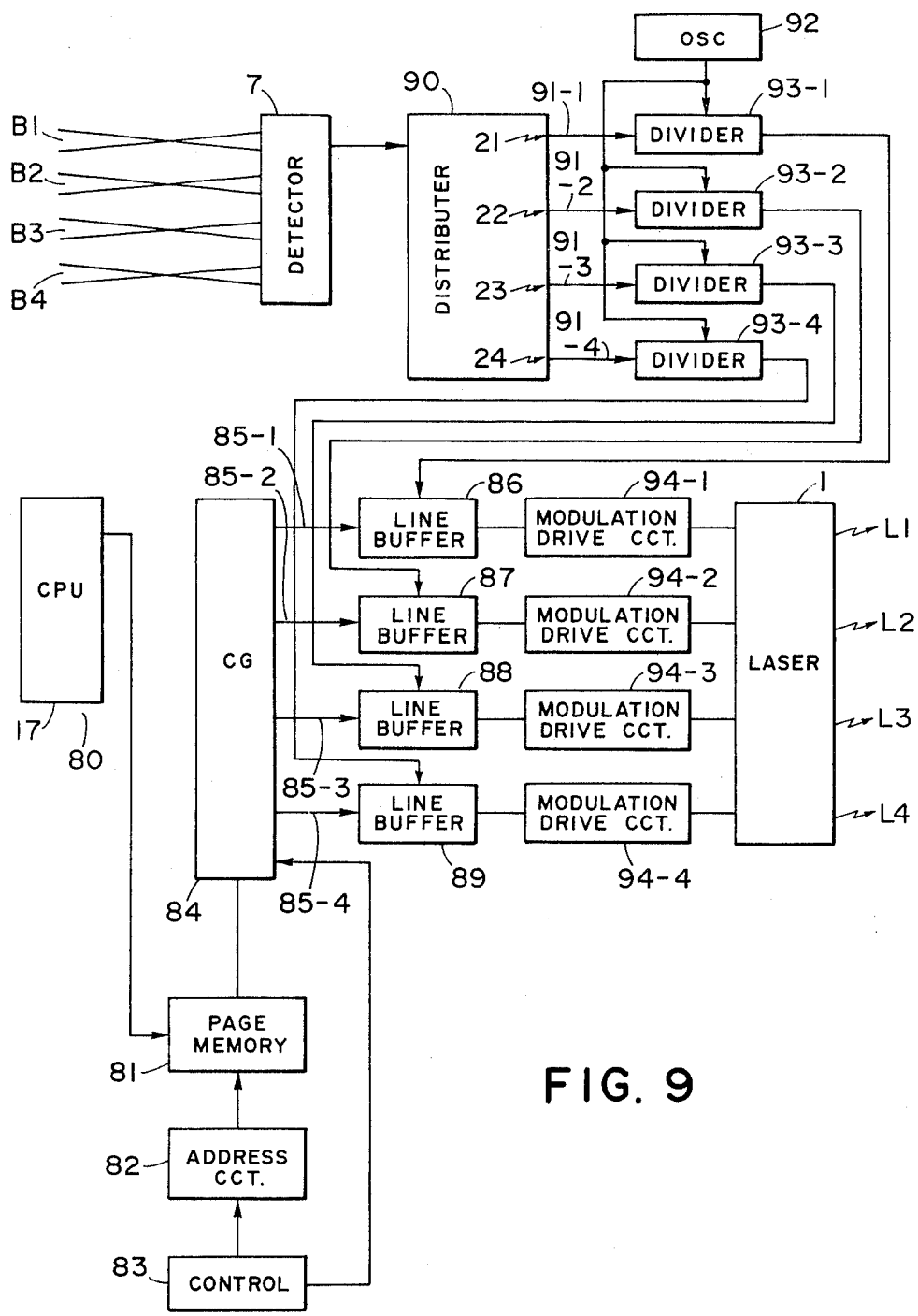
FIG. 9 is a block diagram of the circuit for detecting the beam positions and processing the data signals.

FIG. 9 is a block diagram of the circuit for detecting the beam position and processing data signals in the recording apparatus according to the invention.

Character code signals are read out from a magnetic tape 80 or the like in a CPU 17 and sequentially registered in a page memory 81. The page memory 81 sequentially memorizes the character code signals under the control by an address circuit 82. When the page memory 81 has memorized a predetermined amount of character code signals (corresponding to one page of the recording medium), the memory mode of the page memory is stopped by a control circuit 83 and the mode is changed over to the read mode.

Read-out of data from the page memory 81 is carried out line by line and the character code signals read out by it are sequentially applied to a character generator (CG) 84.

In the character generator 84 there are stored characters as dot matrixes corresponding to the character code signals. When the above character code signal and a signal for indicating a column of the matrix are applied to the character generator, the dot signal belonging to the indicated column is led out onto the output line 85 from the character generator. While in the illustrated embodiment, only four output lines 85 have been shown for the sake of simplicity, the number of output lines 85 may be increased with increasing the number of scanning beams B1-B4.

Dot signals led out onto the output lines 85 in this manner are sequentially registered in line buffers 86-89. Each of the line buffer registers dot signals constituting one of the scanning lines that compose one character line. In other words, the line buffer registers dot signals in an amount corresponding to one scanning line.

On the other hand, the output from the beam detector 7 previously mentioned is applied to the distributor 90 shown in FIG. 7 and timing signals are produced at output lines 91-1 to 91-4.

Designated by 92 is a quartz oscillator for generating clock signals. These clock signals are applied to dividers 93-1 to 93-4. The divider 93 divides the applied frequency down to 1/P. The divider 93 starts operating only when the timing signal is applied thereto. When timing signals as b-e shown in FIG. 6 appear on the output lines 91-1 to 91-4 respectively, the dividers 93-1 to 93-4 form image clock signals as f-i in FIG. 6 respectively.

These image clock signals are respectively applied to the above line buffers 86-89 as reading clock signals. Dot signals registered in the line buffers 86-89 are sequentially read out upon the application of the clock signals.

Figure 1A:
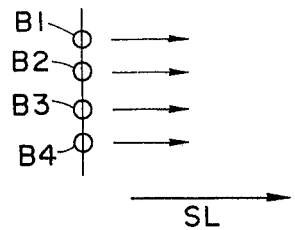
FIGS. 1A and 1B illustrate two possibilities of the arrangement of a plural number of scanning beams.
Figure 1B:
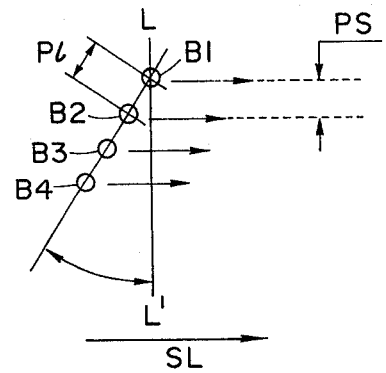

Dot signals thus read out are transmitted to laser light source modulation drive circuits 94-1 to 94-4 to the modulation drive of the array laser 1. Thus, modulated beams L1, L2, L3 and L4 are emitted as shown in FIG. 1. Data are recorded on the photosensitive drum 5 by the beams. When all of the dot signals registered in the line buffers 86-89 have completely been read out, the next line data are read out from the page memory 81.

While, in the illustrated embodiment, only one detector 7 has been used, two or more detectors may be provided. By uniting the outputs of the respective detectors into one there may be obtained the same effect as above.

As readily understood from the foregoing, the present invention brings forth many advantages.

To detect the beam position, only one beam detector can be used for a plural number of beams. A screen plate is provided in front of the detector in such manner that only one beam is allowed to enter the detector at one time. Therefore, the detector does not produce an output signal in which two or more beam outputs are overlapped. This permits the waveform of the output to be shaped in a simple manner with one slicer.

The pulses to be distributed after slicing are obtained by detecting and slicing the beams individually. The detection of beam position is, therefore, carried out with a higher accuracy as compared with the prior art method according to which only the first beam is actually detected and the beam position signals of the remaining beams are formed by extrapolation using timers. In addition, as only one slicer is used, variation of slice level caused by change in temperature or other conditions has no adverse effect on the quality of the produced images. Because a single slicer is used, the slice point is changed equally for all of the beams. Therefore, even when the slice level is changed, for example, by temperature change, such change does not appear on the image as a noticeable lack of synchronism.

Further, according to the invention, a timer is started and also a counter for counting beam number is brought into operation when the first one of the beams is detected by the beam detector. Error in beam detection is detected by measuring the time elapsed between the detection of the first beam and the detection of the last beam. Therefore, a defect in any beam among a plural number of beams can be detected by only one timer. This is a very simple and inexpensive method of detecting error. The advantageous effect of this detection method becomes larger with increasing numbers of beams.

As described above, the present invention provides an improved multibeam recording apparatus which permits to the respective position signals of a plural number of beams arranged at other than right angles with the scan direction to be simply detected and also permits any trouble occurring in any of the beams to be simply detected.

What I claim is:

1. A beam recording apparatus using a plural number of beams, said apparatus comprising:
   means for scanning a recording medium with said beams;
   beam detection means for receiving said beams and producing detection signals in response to receipt of said beams;
   a beam selection member, associated with said detection means, through which only one of said beams of said plural number of beams can pass at one time to be incident on said detection means;
   means for distributing said detection signals; and
   means for controlling the start of recording with said beams individually by means of said distributed detection signals.

2. A beam recording apparatus as set forth in claim 1, wherein the direction in which said plural number of beams are arranged and the scan direction of said beams form an angle other than a right angle.

3. A beam recording apparatus as set forth in claim 1, wherein said beam detection means is able to receive and detect said plural number of beams individually.

4. A beam recording apparatus as set forth in claim 1, further comprising means for storing data; modulating means for modulating said beams for recording in accordance with data read out from said storing means; and wherein said controlling means generates an instruction signal to start reading out the data from said storing means to said modulating means for modulating said beams.

5. A beam recording apparatus as set forth in claim 1, wherein said distributing means comprises means for counting said detection signals and being operative to distribute said detection signals in accordance with the output form said counting means and said detection signals.

6. A beam recording apparatus using a plural number of beams, said apparatus comprising:
   means for scanning a recording medium with said beams;
   a plural number of gates for individually controlling the respective outputs of said beams;
   beam detection means for receiving said beams and producing detection signals, the output of said detection means being connected in parallel to said plural number of gates.
   means for counting the number of times a beam is incident on a predetermined position and for generating an output indicative thereof; and
   means for making said gates open in response to said detection signals and to the output from said counting means.

7. A beam recording apparatus as set forth in claim 6, wherein the direction in which said plural number of beams are arranged and the scan direction form an angle other than a right angle.

8. A beam recording apparatus as set forth in claim 6, wherein the output of said counting means is increased stepwise in accordance with the counting operation.

9. A beam recording apparatus using a plural number of beams, said apparatus comprising:
   means for scanning a recording medium with said beams at the same time;
   means for counting the number of times a beam is incident on a predetermined position; and
   means for detecting the state of said beams in accordance with on whether said counting means counts to a predetermined number of counts within a predetermined time.

10. A beam recording apparatus as set forth in claim 9, wherein the direction in which said plural number of beams are arranged and the scan direction form an angle other than a right angle.

11. A beam recording apparatus as set forth in claim 9, wherein said detecting means includes timer means which starts measuring the predetermined time when a first beam is incident on said predetermined position.

12. A beam recording apparatus using a plural number of beams, said apparatus comprising:
    means for scanning a recording medium with said beams;
    means for receiving said beams and producing detection signals;
    means connected to said receiving and producing means for sequentially generating control signals for controlling said beams individually in response to said detection signals; and
    means for detecting the state of said beams in accordance with whether the number of said control signals generated by said generating and controlling means corresponds to the number of said plural beams.

13. A beam recording apparatus as set forth in claim 12, further comprising means for storing data; modulating means for modulating said beams for recording in accordance with data read out from said storing means; and wherein said control signals also constitute an instruction to read out data from said storing means to said modulating means for modulating said beams.

14. A beam recording apparatus as set forth in claim 12, wherein said detecting means includes means for holding, during a predetermined time, the control signal first generated in one scanning period in response to the detection signal representing the first beam received by said receiving and producing means and wherein said detecting means detects said state by detecting coincidence of said control signal held by said holding means and the control signal generated in the one scanning period in response to the detection signal representing the last beam expected to be received by said receiving and producing means.

15. A beam recording apparatus using a plural number of beams, said apparatus comprising:
    means for scanning a recording medium with said beams;
    means for counting the number of times a beam is incident on a predetermined position and for generating a predetermined signal in response to the value of the count, and
    means for controlling the scanning with said beams individually in accordance with the output signal of said counting means.

16. A beam recording apparatus according to claim 15, wherein said counting means counts the number of times a beam is incident on the predetermined position during each scanning of said beams by said scanning means.

17. A beam recording apparatus according to claim 15 wherein said predetermined position is at a location through which said beams pass prior to scanning of the recording medium therewith.

18. A beam recording apparatus according to claim 17 further comprising means for detecting beam incidence located at said predetermined position.

* * * * *

UNITED STATES PATENT AND TRADEMARK OFFICE
CERTIFICATE OF CORRECTION

PATENT NO. : 4,404,571            Page 1 of 2

DATED : September 13, 1983

INVENTOR(S) : TAKASHI KITAMURA

It is certified that error appears in the above-identified patent and that said Letters Patent is hereby corrected as shown below:

Column 1

Lines 12-13, change "simple" to --single--.

Column 2

Lines 9-10, change "patent application" to --Patent Application--,

Line 34, change "permit" to --permits--,

Line 41, change "mudulation" to --modulation--.

Column 4

Line 3, change "c" to --$\underline{c}$--,

Line 18, delete "of", first occurrence,

Line 59, change "a" to --$\underline{a}$--

Line 60, change "b" to --$\underline{b}$--, and change "c" to --$\underline{c}$--, Line 63, change "d" to --$\underline{d}$--, Line 64, change "d" to --$\underline{d}$--.

Column 5

Line 23, change "high" to --High--.

UNITED STATES PATENT AND TRADEMARK OFFICE
CERTIFICATE OF CORRECTION

PATENT NO. : 4,404,571

DATED : September 13, 1983

INVENTOR(S) : TAKASHI KITAMURA

It is certified that error appears in the above-identified patent and that said Letters Patent is hereby corrected as shown below:

Column 7

Line 3, delete "to".

Column 7, line 41
(Claim 5, line 5)

Change "form" to --from--.

Signed and Sealed this

Sixth Day of March 1984

[SEAL]

Attest:

GERALD J. MOSSINGHOFF

Attesting Officer     Commissioner of Patents and Trademarks